(12) United States Patent
Yamkovoy

(10) Patent No.: US 9,025,789 B2
(45) Date of Patent: May 5, 2015

(54) CONNECTION-RESPONSIVE AUDIO SOURCE MANAGEMENT

(75) Inventor: Paul G. Yamkovoy, Acton, MA (US)

(73) Assignee: Bose Corporation, Framingham, MA (US)

( * ) Notice: Subject to any disclaimer, the term of this patent is extended or adjusted under 35 U.S.C. 154(b) by 463 days.

(21) Appl. No.: 13/421,992

(22) Filed: Mar. 16, 2012

(65) Prior Publication Data
US 2012/0177216 A1    Jul. 12, 2012

Related U.S. Application Data

(63) Continuation-in-part of application No. 12/769,898, filed on Apr. 29, 2010, now Pat. No. 8,315,413.

(51) Int. Cl.
| | |
|---|---|
| H04R 1/10 | (2006.01) |
| H04R 5/04 | (2006.01) |
| H04R 5/033 | (2006.01) |
| H04R 27/00 | (2006.01) |

(52) U.S. Cl.
CPC *H04R 5/04* (2013.01); *H04B 1/385* (2013.01); *H04R 5/033* (2013.01); *H04R 27/00* (2013.01); *H04R 2420/01* (2013.01); *H04R 2460/01* (2013.01); *H04R 2460/07* (2013.01); *H04R 2499/13* (2013.01)

(58) Field of Classification Search
CPC ...... H04R 5/04; H04R 5/033; H04R 2420/01; H04R 2460/01; H04R 2460/03; H04R 2460/07; H04B 1/385

USPC ............ 381/74, 119, 370, 309, 384, 77, 123, 381/58, 107, 323

See application file for complete search history.

(56) References Cited

U.S. PATENT DOCUMENTS

| | | | |
|---|---|---|---|
| 3,662,113 A * | 5/1972 | Von Recklinghausen | ........ 381/8 |
| 4,941,187 A * | 7/1990 | Slater | ............... 381/86 |
| 5,497,206 A * | 3/1996 | Ji | ............... 348/738 |
| 2001/0053227 A1 | 12/2001 | Narasimhan | |
| 2002/0146987 A1 | 10/2002 | Maden | |
| 2003/0013503 A1 | 1/2003 | Menard et al. | |
| 2003/0029707 A1 | 2/2003 | Gillman et al. | |
| 2009/0076504 A1 | 3/2009 | Schnitzler | |
| 2011/0013780 A1 | 1/2011 | Yamkovoy | |
| 2011/0268295 A1 | 11/2011 | Yamkovoy et al. | |

OTHER PUBLICATIONS

Invitation to Pay Additional Fees dated Nov. 12, 2013 for International Application No. PCT/US2013/028794.
International Search Report and Written Opinion dated Dec. 16, 2013 for International Application No. PCT/US2013/028794.

* cited by examiner

Primary Examiner — Paul S Kim

(57) ABSTRACT

Apparatus and method to mix first and second audio channels provided to a headset in response to the quantity of audio devices coupled to its connectors, in response to whether any of those audio devices provides more than one audio channel, and in response to their being a complete lack of electric power provided by any audio device and from a power source of the apparatus, itself.

15 Claims, 5 Drawing Sheets

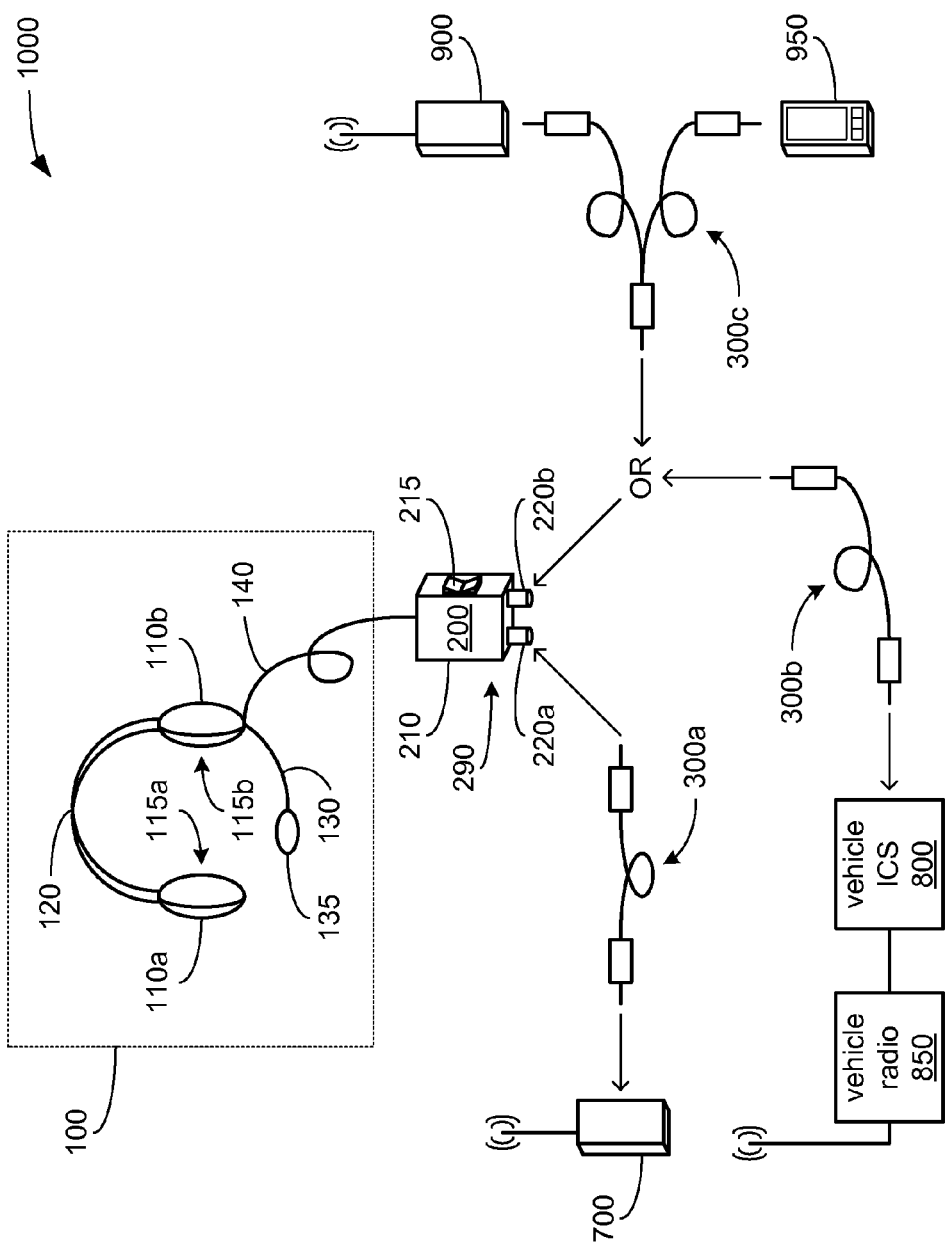

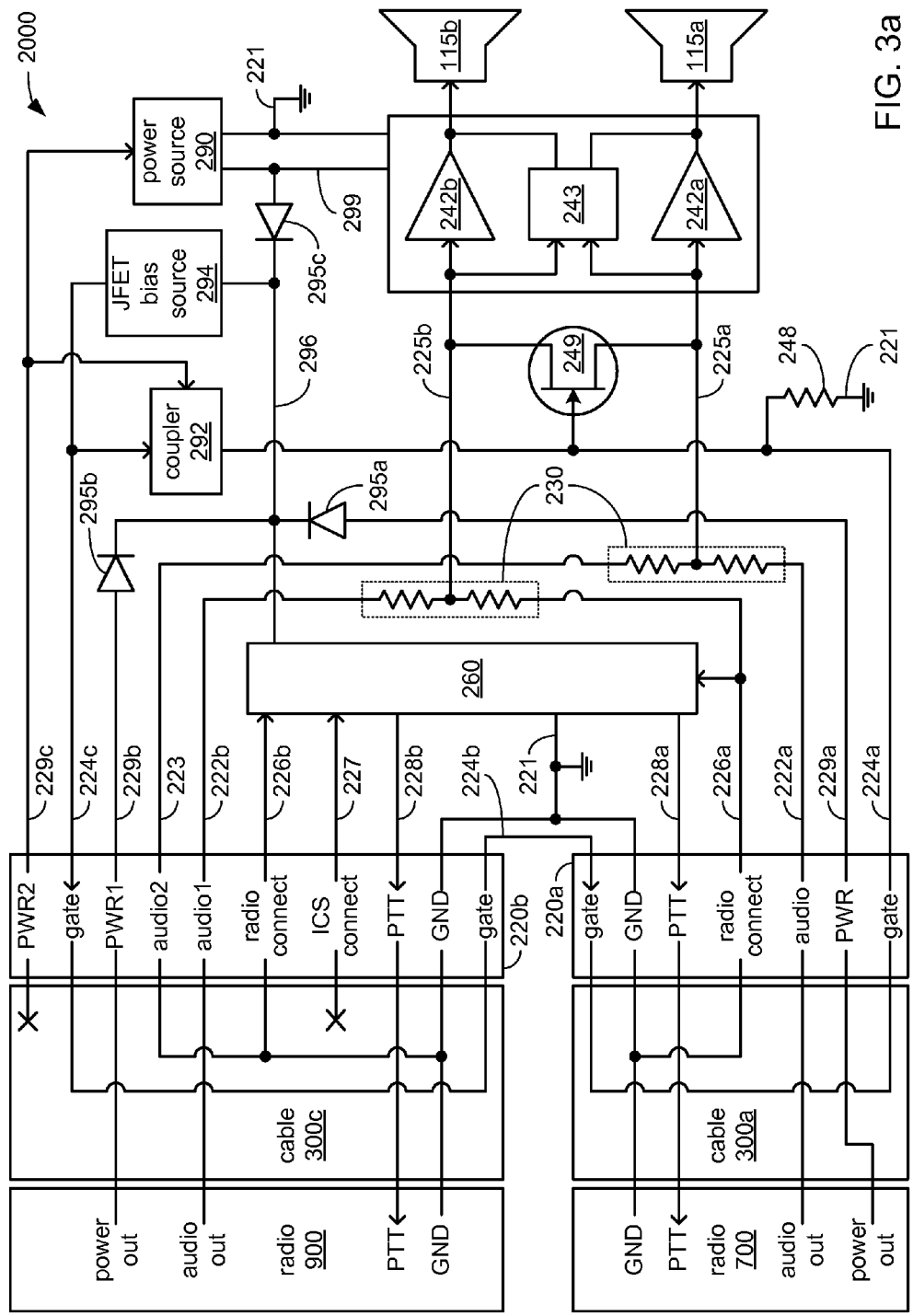

CONNECTION-RESPONSIVE AUDIO SOURCE MANAGEMENT

CROSS-REFERENCE TO RELATED APPLICATION

The present application is a continuation-in-part of application Ser. No. 12/769,898 filed Apr. 29, 2010 by Paul G. Yamkovoy and Mark Bergeron, now U.S. Pat. No. 8,315,413, the disclosure of which is incorporated herein by reference.

TECHNICAL FIELD

This disclosure relates to automatically altering the mixing of audio from multiple audio sources for acoustic output to the ears of a user of headset, including two-way communications headsets having automatically alterable push-to-talk (PTT) functionality.

BACKGROUND

Two-way communications headsets are in common use in many types of vehicles and with various large pieces of machinery, especially vehicles and machinery that create or are typically operated in a high noise environment such that necessary two-way communications with the driver, operator or pilot would be impaired without such headsets. Examples of such noisy environments include airplane cockpits, driver's compartments in commercial trucks and tractors, operator cabins in cranes and tunnel boring machines, and crew compartments in tanks and other military vehicles. It is commonplace for such vehicles and machinery to incorporate an intercom system providing one or more connection points to which such headsets are coupled. Such intercoms typically cooperate with multiple ones of such headsets to enable personnel within or in the immediate vicinity of such vehicles to communicate with each other, and such intercoms typically incorporate long-range wireless transceivers enabling personnel to use such headsets in communicating with other personnel at a distance.

It has recently become desired to further enable such headsets to be coupled to portable audio devices that personnel may carry with them, in addition to being able to be coupled to an intercom system of a vehicle or large piece of machinery. Therefore, it has become desirable to enable the simultaneous coupling of a headset to both an intercom system and a personal audio device in a manner that provides a high degree of ease of use of such a combination, and incorporates the ability to maintain a high degree of functionality in the event of the headset losing power normally provided by its own power source without draining the power sources of portable radios or other devices to which the headset is connected.

SUMMARY

Apparatus and method to mix first and second audio channels provided to a headset in response to the quantity of audio devices coupled to its connectors, in response to whether any of those audio devices provides more than one audio channel, and in response to their being a complete lack of electric power provided by any audio device and from a power source of the apparatus, itself.

In one aspect, an apparatus includes a first earpiece into which a first acoustic driver is disposed to acoustically output a first audio channel, a second earpiece into which a second acoustic driver is disposed to acoustically output a second audio channel, a first connector to enable coupling of audio devices to the apparatus, a second connector to enable coupling of audio devices to the apparatus, and a coupler. The coupler couples the first and second audio channels such that the same audio is acoustically output by both the first and second acoustic drivers in response to either of a lack of electric power provided to the apparatus through the first connector, through the second connector and from a power source of the apparatus, or an audio device being coupled to only one of the first and second connectors, wherein the audio device provides the apparatus with only one audio channel.

The coupler may refrain from coupling the first and second audio channels in response to an audio device providing the apparatus with more than one audio channel being coupled to the first connector. Further, the audio device providing the apparatus with more than one audio channel may be an ICS.

The apparatus may also include a JFET bias source structured to be provided with electric power from any of the first connector, the second connector and the power source of the apparatus; and the coupler may be a JFET that becomes non-conductive such that the first and second audio channels are not coupled in response to a gate of the JFET being coupled to the JFET bias source.

In another aspect, a method includes monitoring a first connector of an apparatus; monitoring a second connector of an apparatus; and operating a coupler to couple a first audio channel to be acoustically output by a first acoustic driver of the apparatus to a second audio channel to be acoustically output by a second acoustic driver of the apparatus such that the same audio is acoustically output by both the first and second acoustic drivers in response to either of a lack of electric power provided to the apparatus through the first connector, through the second connector and from a power source of the apparatus, or an audio device being coupled to only one of the first and second connectors, wherein the audio device provides the apparatus with only one audio channel.

Other features and advantages of the invention will be apparent from the description and claims that follow.

DESCRIPTION OF THE DRAWINGS

FIGS. 1a and 1b are perspective diagrams of variants of a headset.

FIGS. 3a and 3b are each a subset of the block diagram of FIG. 2, with each additionally depicting the attachment of different combinations of audio devices and cables by which those audio devices are attached.

DETAILED DESCRIPTION

Figure 1B:
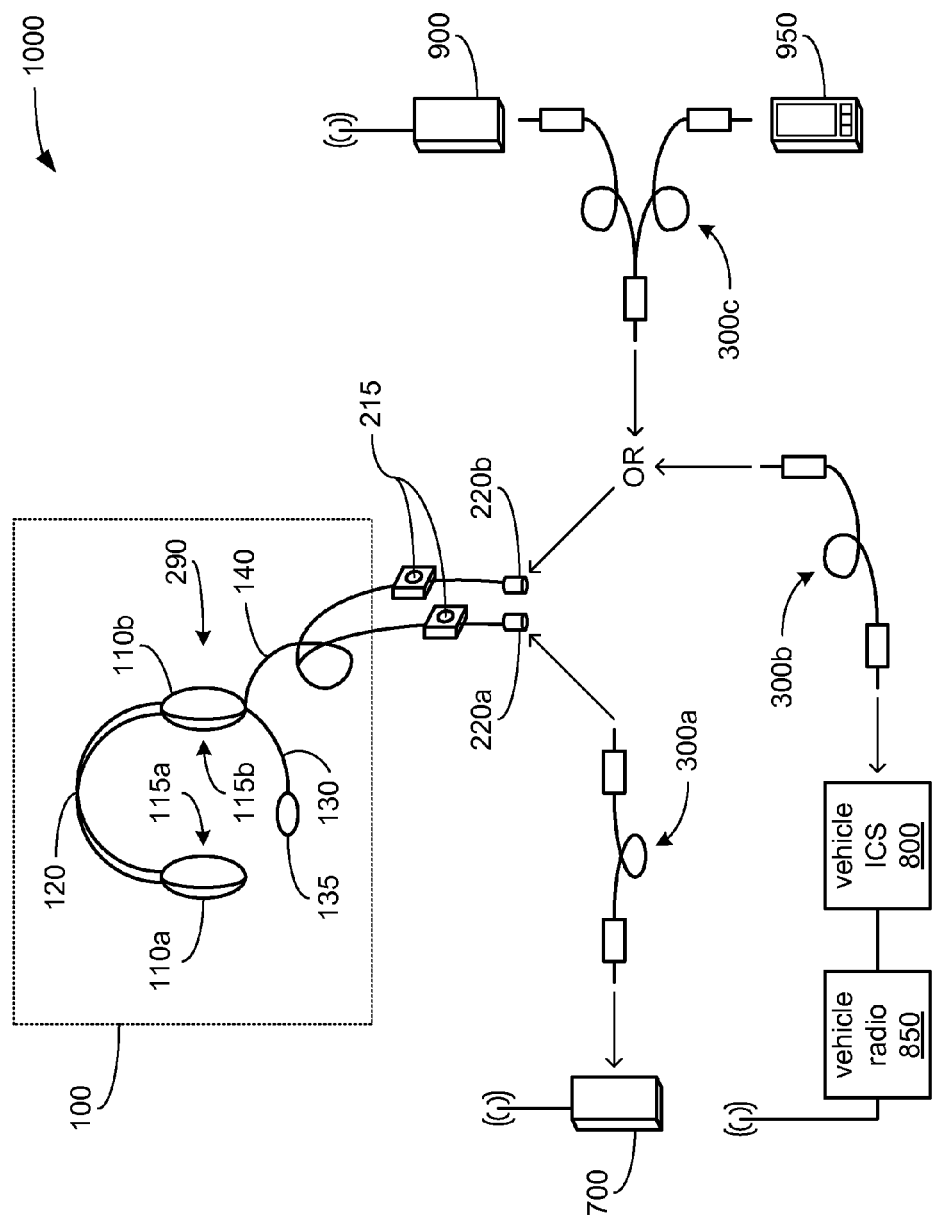

What is disclosed and what is claimed herein is intended to be applicable to a wide variety of headsets, i.e., devices meant to be worn on or about a user's head in a manner in which at least one acoustic driver is positioned in the vicinity of an ear, and perhaps a microphone is positioned towards the vicinity of the user's mouth (or along their throat or in an ear) to enable two-way audio communications. It should be noted that although specific embodiments of headsets incorporating a pair of acoustic drivers (one for each of a user's ears) are presented with some degree of detail, such presentations of specific embodiments are intended to facilitate understanding through examples, and should not be taken as limiting either the scope of disclosure or the scope of claim coverage.

It is intended that what is disclosed and what is claimed herein is applicable to headsets that also provide active noise reduction (ANR), passive noise reduction (PNR), or a combination of both. It is intended that what is disclosed and what is claimed herein is applicable to headsets structured to be connected with at least an intercom system and/or at least one radio through a wired connection, but which may be further structured to be connected to any number of additional devices through wired and/or wireless connections. It is intended that what is disclosed and what is claimed herein is applicable to headsets having physical configurations structured to be worn in the vicinity of either one or both ears of a user, including and not limited to, over-the-head headsets with either one or two earpieces, behind-the-neck headsets, two-piece headsets incorporating at least one earpiece and a physically separate microphone worn on or about the neck, as well as hats or helmets incorporating one or more earpieces and one or more microphones to enable audio communication. Still other embodiments of headsets to which what is disclosed and what is claimed herein is applicable will be apparent to those skilled in the art.

FIG. 1a depicts an embodiment of a headset 1000 having an "over-the-head" physical configuration. The headset 1000 incorporates a head assembly 100, a control box 200, and one or more of cables 300a, 300b and/or 300c. The head assembly 100 incorporates a pair of earpieces 110a and 110b that each incorporate an acoustic driver 115a and 115b, respectively, a headband 120 that couples together the earpieces 110a and 110b, a microphone boom 130 extending from the earpiece 110b to support a communications microphone 135, and a cable 140 coupling the earpiece 110b to the control box 200. The control box 200 incorporates a casing 210, a manually-operable push-to-talk (PTT) switch 215, and a pair of connectors 220a and 220b by which one or more of the cables 300a-c may be coupled to the control box 200. Each of the cables 300a-c are configured to enable one or more audio devices to be coupled to the control box 200, specifically, one or more of a radio 700, a vehicle intercom system (ICS) 800 (and perhaps to a vehicle radio 850 through the ICS 800), a radio 900 and an audio source 950.

It should be noted that although the head assembly 100 is depicted with both the cable 140 and the microphone boom 130 being coupled to the same one of the earpieces 110a and 110b, other configurations of the head assembly 100 are possible in which they are coupled to separate ones of the earpieces 110a and 110b. It should be noted that although the cable 140 is depicted in a manner suggesting that the cable 140 is coupled to both the earpiece 110b and the control box 200 without connectors such that the cable 140 is not separable from either of these, other configurations are possible in which connectors (not shown) are used to couple the cable 140 to one or both of these. It should be noted that although the control box 200 is depicted as having a particular shape and a particular size relative to other components of the headset 1000, the control box 200 may be of any of a variety of sizes and shapes. Further, although the control box 200 is depicted as being physically distinct from all components of the head assembly 100, other configurations of the headset 1000 are possible in which the control box 200 is integrated into one of the earpieces 110a or 110b (such that the PTT switch 215 may be disposed on a casing of one or the other of the earpieces 110 or 110b, or one or more of the PTT switch 215 is carried along one or more sections of cabling—see FIG. 1b), or is integrated into the head assembly 100 in some other manner. It should be noted that although the connectors 220a and 220b are depicted as being disposed on the casing 210 of the control box 200, other configurations are possible in which one or both of the connectors 220a and 220b are separated from the casing 210 and are coupled to the casing 210 via one or more cables (not shown). It should be noted that although each of the cables 300a-c is depicted as having connectors on both ends, other configurations of one or more of the cables 300a-c are possible in which there are connectors only on the ends configured to be coupled to the control box 200.

The head assembly 100 is given its over-the-head physical configuration by the headband 120. Depending on the size of each of the earpieces 110a and 110b relative to the typical size of the pinna of a human ear, each of the earpieces 110a and 110b may be either an "on-ear" (also commonly called "supra-aural") or an "around-ear" (also commonly called "circum-aural") form of earcup. As will be explained in greater detail, the provision of an acoustic driver 115a and 115b in each of the earpieces 110a and 110b, respectively, enables the headset 1000 to acoustically output two-channel audio (e.g., stereo audio) to a user. However, it is important to note that it is commonplace for an intercom system (e.g., the ICS 800) to provide two-channel audio in which the two channels of audio do not necessarily represent a common piece of audio with a relationship such as "left" and "right" that provides a user with a spatial effect (the two channels may be related in other ways, or the very same audio may be provided on both channels). The microphone boom 130 positions the communications microphone 135 in the vicinity of the mouth of a user of the headset 1000 when the head assembly 100 is correctly worn such that the earpieces 110a and 110b are in the vicinity of corresponding ones of the user's ears. However, despite the depiction in FIG. 1a of this particular physical configuration of the head assembly 100, those skilled in the art will readily recognize that the head assembly may take any of a variety of other physical configurations. By way of example, alternate embodiments may incorporate a "behind-the-head" or "behind-the-neck" (e.g., what may be called a "napeband") variant of band in place of the headband 120, may position the communications microphone 135 on a portion of one or the other of the earpieces 110a and 110b (rather than at the end of the microphone boom 130), and/or may be structured to permit one or both of the cable 140 and the microphone boom 130 to be attachable to either of the earpieces 110a and 110b.

As depicted, the cable 300a enables the radio 700 to be coupled to the connector 220a, the cable 300b enables the ICS 800 to be coupled to the connector 220b (and through the ICS 800, perhaps also the radio 850), and the cable 300c enables either or both of the radio 900 and the audio source 950 to be coupled to the connector 220b. The radio 700 may be coupled through the cable 300a to the control box 200, along with either the ICS 800 (and perhaps also the radio 850) through the cable 300b or one or both of the radio 900 and the audio source 950 through the cable 300c. As will be explained in greater detail, mixing circuitry of the control box 200 enables various forms of mixing of audio output by various combinations of these audio devices (i.e., the radio 700, the ICS 800, the radio 850, the radio 900 and the audio source 950) to the ears of a user of the headset 1000. As will also be explained, the exact manner in which mixing is carried out changes automatically in response to which ones of these audio devices are coupled to the control box 200 and/or are active.

As depicted, the PTT switch 215 is a pivoting 3-position rocker switch having a spring-like bias towards one of the positions, and operable by a user of the headset 1000 to either of the other two positions to enable the user to selectively use the push-to-talk function of only one of multiple audio devices that may be coupled to the connectors 220a and/or 220b (e.g., the radio 700, the radio 900, the ICS 800, or the radio 850 through the ICS 800) at any given time. In other words, a user may press their index finger against a surface (or a portion of a surface) of the PTT switch 215 to employ its pivoting action to select and engage the PTT function of one audio device, or the user may press their second finger against a different surface (or different portion of the same surface) to employ its pivoting action to select and engage the PTT function of another audio device. It is intended that associating different ones of the different positions with selecting one audio device, selecting another audio device or selecting neither will inherently prevent a user from inadvertently selecting and engaging the PTT functions of more than one audio device, simultaneously. However, it should be noted that alternate embodiments are possible in which a different form of the PTT switch 215 and/or multiple ones of the PTT switch 215 (such as separate PTT switches for each audio device, as depicted in one exemplary form in FIG. 1b) are provided that are intended to allow a user to engage the PTT functions of more than one audio device, simultaneously.

It is envisioned that the headset 1000 is well suited for use by personnel who both travel in a noisy environment within a vehicle having the ICS 800 installed therein to enable communication among them, and who also work collaboratively in a noisy environment outside that vehicle while relying on radios (such as the radio 700) carried by each of them to enable communication among them. It is further envisioned that vehicle may incorporate the vehicle radio 850 (accessible through the ICS 800), that one or more of the personnel may carry another radio (such as the radio 900), and/or that one or more of the personnel may carry another audio device outputting audio (such as the audio source 950). One example of such use is that of soldiers in a military vehicle (a wheeled vehicle, a vehicle having tracks, a helicopter, a small motorized boat, etc.) having the ICS 800, and possibly also the vehicle radio 850. As will be familiar to those skilled in the art of military communications, such vehicles are often noisy inside such that the provision of the ICS 800 is necessary to enable personnel to hear each other talking. Further, depending on conditions at a destination reached by such a vehicle, battlefield sounds and/or physical separation of personnel on patrol or engaged in combat often necessitate the use of radios carried by each of the personnel to, again, hear each other talking. Still further, one or more of such personnel may also be carrying another radio to communicate across greater distance to still other personnel, perhaps personnel in another vehicle (e.g., a pilot in a supporting aircraft). Yet further, one or more of such personnel may also be carrying another device outputting audio (i.e., another audio source) such as a talking global positioning system (GPS) device, etc. However, it should be noted that this envisioned military example is not the only possible application of the headset 1000, or other headsets having a similar configuration. Another envisioned application is that of pilots and passengers in propeller aircraft or helicopters in which an intercom system (e.g., the ICS 800) is also required for such people to hear each other talking. Further, such people may need to employ radios carried on their persons to continue being able to hear each other talking when their aircraft is on the ground in a noisy location (perhaps due to the running of engines and/or movement of air caused by propellers in motion).

FIG. 1b depicts an alternate embodiment of the headset 1000 in which much of the functionality and at least some of the components of the control box 200 are incorporated into one or both of the earpieces 110a and 110b, with the exception of a PTT switch. Instead, the single PTT switch 215 of FIG. 1a has been replaced with a multitude of PTT switches 215, one for each branch of a Y-cable variant of the cable 140, the end of each branch having one of the connectors 220a and 220b disposed thereon, although other configurations of the cable 140 and of the multiple PTT switches 215 are possible, as those skilled in the art will readily recognize. In yet another embodiment, each of multiple ones of the PTT switches 215 may be disposed on a portion of each of the cables 300a, 300b and 300c.

Figure 2:
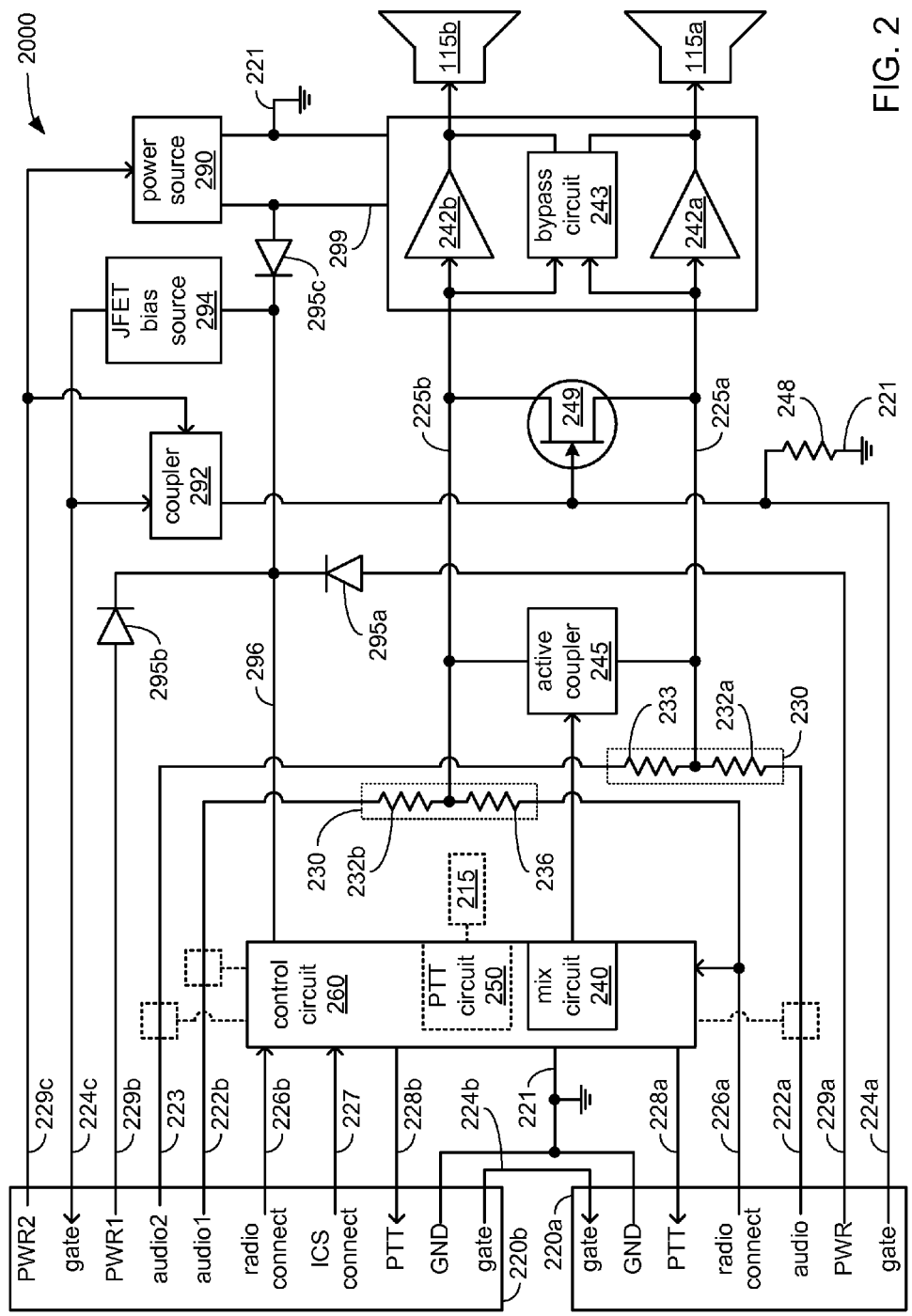
FIG. 2 is a block diagram of an electrical architecture employable in a portion of either variant of the headset of FIG. 1a or 1b.

FIG. 2 provides a partially schematic-like block diagram of portions of a possible electrical architecture 2000 for at least mixing circuitry that may be employed by either of the variants of the headset 1000 depicted in FIGS. 1a and 1b. In other words, while some conductors and circuit components that are germane to the presentation and understanding of particular aspects of the headset 1000 are depicted in considerable detail, other conductors and other components that are not so germane are depicted in less detail or not at all in an effort to avoid distracting from the presentation and understanding of those particular aspects. Thus, for example, not every power supply connection required for the operation of every component and not every ground return path required in the conveyance of audio signals is depicted. Further, although both variants of the headset 1000 depicted in FIGS. 1a and 1b incorporate the communications microphone 135 that is meant to be employed in enabling two-way audio communications, the communications microphone 135, its supporting components (e.g., a pre-amplifier, etc.) and its electrical connections are not depicted in the presentation of the electrical architecture 2000 in FIG. 2—and again, this should not be taken as an indication of the communications microphone 135 and its supporting components not being present.

Of what is depicted, the electrical architecture 2000 incorporates at least some of the acoustic drivers 115a and 115b; perhaps a PTT switch 215 (maybe more than one); the connectors 220a and 220b; multiple resistors 232a, 232b, 233, 236 and 248; a pair of audio amplifiers 242a and 242b; a bypass circuit 243; an active coupler 245; a JFET 249; a control circuit 260 incorporating a mix circuit 240 and perhaps also a PTT circuit 250; a power source 290; a coupler 292; a JFET bias source 294; and multiple diodes 295a, 295b and 295c. Different ones of the electrical components depicted in FIG. 2 may be disposed at different locations throughout the structure of the headset 1000. In embodiments of the headset 1000 having a physical configuration that is at least somewhat similar to what is depicted in FIG. 1a, the acoustic drivers 115a and 115b, the audio amplifiers 242a and 242b and the bypass circuit 243 may be disposed entirely among the casings of the earpieces 110a and 110b (and/or elsewhere within the head assembly 100), and be electrically coupled to much of the rest of what is depicted of the electrical architecture 2000 via the cable 140. In embodiments of the headset 1000 having a physical configuration that is at least somewhat similar to what is depicted in FIG. 1b, the connectors 220a and 220b may be disposed at an end of the cable 140, and be electrically coupled to much of the rest of what is depicted of the electrical architecture 2000 via the cable 140, which may be mostly or entirely disposed within portions of the head assembly 100.

The connectors 220a and 220b incorporate ground contacts coupled to a ground conductor 221 to which various other components of the headset 1000 are also coupled, including at least the audio amplifiers 242a and 242b, the control circuit 260, and the power source 290 (as specifically depicted). The connector 220a incorporates an audio contact coupled to an audio conductor 222a that is coupled to the resistor 232a, and the connector 220b incorporates both audio1 and audio2 contacts coupled to audio conductors 222b and 223 that are coupled to the resistors 232*b* and 233, respectively. The connector 220*a* incorporates a pair of gate contacts, one of which is coupled to a gate conductor 224*a* that is coupled to the resistor 248, the gate input of the JFET 249, and the coupler 292. The connector 220*b* incorporates a pair of gate contacts, one of which is coupled to a gate conductor 224*b* that is coupled to the other of the gate contacts of the connector 220*a*, and the other of which is coupled to a gate conductor 224*c* that is coupled to the coupler 292 and the output of the JFET bias source 294. The connector 220*a* incorporates a radio connect contact coupled to a radio connect conductor 226*a* that is coupled to the control circuit 260, and the connector 220*b* may also incorporate a radio connect contact coupled to a radio connect conductor 226*b* that may also be coupled to the control circuit 260. Also, the connector 220*b* incorporates an ICS connect contact coupled to an ICS connect conductor 227 that is also coupled to the control circuit 260. The connectors 220*a* and 220*b* each incorporate a PTT contact, each of which is coupled to one of two PTT conductors 228*a* and 228*b*, respectively, that are each separately coupled to the control circuit 260. The connector 220*a* incorporates a power contact coupled to a power conductor 229*a* that is further coupled to the anode of the diode 295*a*, and the connector 220*b* incorporates two power contacts coupled to power1 conductor 229*b* and the power2 229*c*, of which the power1 conductor 229*b* is further coupled to the anode of the diode 295*b* and the power2 conductor 229*c* is coupled to the power source 290 and a control input of the coupler 292.

The coupling of the power source 290 to the power2 conductor 229*c* enables the power source to be recharged and/or temporarily replaced with electric power provided by an ICS when an ICS is coupled to the connector 220*b*. An output of the power source 290 is coupled to a power conductor 299 to provide electric power (using the ground conductor 221 as the return path for electric current) to the anode of the diode 295*c*, as well as to at least the audio amplifiers 242*a* and 242*b*. The cathodes of all three of the diodes 295*a*, 295*b* and 295*c* are coupled to each other with their common node 296 being further coupled to at least the control circuit 260 and the JFET bias source 294. This arrangement of the diodes 295*a-c* enables electric power to be provided to at least the control circuit 260 and the JFET bias source 294 from any of the power source 290, an audio device coupled to the connector 220*a* and/or an audio device coupled to the connector 220*b*, but without electric power being conveyed between two or more of those sources of electric power. Thus, while the audio amplifiers 242*a-b* are provided with electric power only by the power source 290 that is incorporated into the headset 1000 (or only by an ICS that temporarily replaces the power source 290), the control circuit 260 and the JFET bias source 294 are able to be provided with electric power by any one of the aforementioned three possible sources of electric power. This is in recognition of the likelihood that audio devices coupled to the contacts that are coupled to the power conductor 229*a* or the power1 conductor 229*b* of either of the connectors 220*a* or 220*b*, respectively, will provide electric power with a current capacity that is limited to such an extent as to be able to meet the relatively smaller demands of powering the control circuit 260 and the JFET bias source 294 (typical example of such audio devices being radios), but not able to meet the relatively greater demands of the audio amplifiers 242*a-b*. Instead, the relatively greater demands of providing electric power to the audio amplifiers 242*a-b* are met by the power source 290 (or temporarily by an ICS through the power2 conductor 229*c*). As those skilled in the art will readily recognize, a vehicle-mounted ICS typically has access to the electric power provided by an alternator or other generator coupled to an engine of that vehicle, and therefore, typically has sufficient capacity to meet those relatively greater demands, as well as to meet the demands of recharging the power source 290 (where the power source 290 is a rechargeable battery). Further, the power source 290 is specifically selected to be capable of meeting those relatively greater demands at times when electric power from an ICS is unavailable. It is envisioned that the power source 290 is a battery, although other forms of electric power source are possible.

The resistors 232*a* and 233 are coupled to each other with their common node 225*a* being further coupled to an input of the audio amplifier 242*a* and an input of the bypass circuit 243, as well as being coupled to both the active coupler 245 and the JFET 249. The resistors 232*a* and 233 cooperate to serve as a passive mixer of audio signals received via the audio conductor 222*a* and via the audio2 conductor 223, respectively. The resistors 232*b* and 236 are similarly coupled to each other with their common node 225*b* being further coupled to an input of the audio amplifier 242*b* and another input of the bypass circuit 243, as well as being coupled to both the active coupler 245 and the JFET 249. The resistors 232*b* and 236 function to subject audio signals received via the audio1 conductor 222*b* to the same degree of attenuation to which audio signals received via either the audio conductor 222*a* or the audio2 conductor 223 are subjected. This is done to balance the amplitudes of whatever audio is acoustically output to each ear of a user of the headset 1000 by the acoustic drivers 115*a* and 115*b*. Thus, the resistors 232*a*, 232*b*, 233 and 236 form a pair of mixing circuits 230 that maintain a balance in amplitude between signals on the nodes 225*a* and 225*b* regardless of what audio devices are coupled to the connectors 220*a-b*.

Outputs of the audio amplifiers 242*a* and 242*b* are coupled to the acoustic drivers 115*a* and 115*b*, respectively. Separate outputs of the bypass circuit 243 are also coupled to each of the acoustic drivers 115*a-b*. During normal operation of the headset 1000 in which electric power is being provided to the audio amplifiers 242*a* and 242*b* by the power source 290, the audio amplifiers 242*a* and 242*b* amplify the audio signals received at their inputs and drive the acoustic drivers 115*a* and 115*b*, respectively, with amplified forms of those audio signals. Although not specifically shown, a manually-operable control may be incorporated into a portion of the headset 1000 that is coupled to the audio amplifiers 242*a* and 242*b* to adjust their gain, and thereby, adjust the amplitude with which the acoustic drivers 115*a* and 115*b* acoustically output audio to a user of the headset 1000. During operation of the headset 1000 in which electric power is not being provided by the power source 290 (e.g., where the power source 290 is depleted and/or disconnected from the headset 1000), the audio amplifiers 242*a* and 242*b* may be deprived of power and cease to function to provide amplification of audio signals. In response to this loss of electric power, the bypass circuit 243 electrically couples the common node 225*a* of the resistors 232*a* and 233 to the acoustic driver 115*a*, and electrically couples the common node 225*b* of the resistors 232*b* and 236 to the acoustic driver 115*b*, thereby permitting whatever audio devices that are coupled to the connectors 220*a* and/or 220*b* to more directly drive the acoustic drivers 115*a* and/or 115*b* with audio signals.

The control circuit 260 employs one or more possible techniques to monitor the connectors 220*a* and 220*b* to determine whether or not some form of audio device is coupled to either of them and/or what such audio device(s) are (e.g., identifying whether a radio or an ICS is so coupled). The control circuit 260 may simply monitor the state of such conductors as the radio connect conductors 226a-b and/or the ICS connect conductor 227 for instances of a voltage within a predetermined range of voltages being driven onto one or more of these conductors and/or one or more of these conductors being coupled the ground conductor 221 (which may effectively be the same as a 0 voltage level being driven onto one or more of these conductors). Alternatively and/or additionally, the control circuit 260 may be indirectly coupled to one or more of the audio conductor 222a, the audio1 conductor 222b and/or the audio2 conductor 223 through additional circuitry (this being depicted in dotted lines) to allow the control circuit 260 to coordinate the selective driving of a voltage level and/or a signal of predetermined characteristics (i.e., injecting a signal of known characteristics) onto one or more of these conductors and to monitor a resistance level, a level of current flow and/or a voltage level that results to determine if there is an audio device coupled one or more of these conductors. Also alternatively and/or additionally, the control circuit 260 may be coupled to conductors conveying signals between the communications microphone 135 and each of the connectors 220a and 220b, and either monitor those conductors for the presence (or absence) of microphone bias voltage levels or inject a signal of known characteristics onto those conductors.

Regardless of what mechanism the control circuit 260 employs to identify when audio devices are coupled to either of the connectors 220a-b and/or to identify what they are, the mix circuit 240 (and the PTT circuit 250, if present) employ what the control circuit 260 determines concerning the connection of audio devices to control the manner in which audio for output by the acoustic drivers 115a-b is mixed (and perhaps also the manner in which the different positions to which the PTT switch 215 may be operated are used). For example, with regard to mixing of audio for output by the acoustic drivers, the mix circuit 240 selectively operates the active coupler 245 (to which it is coupled) to either electrically coupled the nodes 225a and 225b, or not, depending on whether there is audio being supplied to only one or both of the nodes 225a and 225b by whatever audio device(s) are coupled to the connectors 220a and/or 220b. Specifically, if there is only a single radio coupled to one of the connectors 220a-b such that audio is being supplied to only one of the nodes 225a-b, then the mix circuit 240 operates the active coupler 245 to couple the nodes 225a-b together so that such audio is supplied on both of these nodes so that the user hears this audio being presented to both ears. In contrast, if there are multiple audio devices (e.g., a combination of two radios, or a combination of a radio and an ICS) resulting in audio being supplied to both of the nodes 225a-b, then the mix circuit 240 operates the active coupler 245 to not couple these nodes, thereby allowing what may be different audio on each of the nodes 225a-b to remain separate.

The provision of separate audio to each of the ears of a user can allow the user to easily identify the source of a given piece of audio to which the user is listening. For example, if two radios are coupled to the headset 1000 (e.g., one radio coupled to each of the connectors 220a-b) such that each radio supplies audio on a separate one of the nodes 225a and 225b, then a user of the headset 1000 can easily identify which radio they are receiving a given piece of audio through by which ear that piece of audio is presented to. Also for example, if a radio and an ICS are coupled to the headset 1000, the fact that an ICS tends to provide two-channel audio that would be driven onto both of the nodes 225a and 225b would allow a user to distinguish a piece of audio provided by an ICS from a piece of audio provided by a radio, which would typically be driven onto only one of the nodes 225a and 225b.

Regarding the PTT switch 215, the PTT switch 215 and the associated PTT circuit 250 are depicted in dotted line form in recognition of the PTT circuit 250 possibly being incorporated into the control circuit 260 and the PTT switch 215 possibly being coupled to the control circuit 260 in embodiments such as what is depicted in FIG. 1a where there is a single PTT switch 215 able to be operated to engage the PTT function of one of multiple audio devices, but not so likely in embodiments such as what is depicted in FIG. 1b where there are separate PTT switches 215 for each audio device. Where the PTT circuit 250 is so incorporated and there is a single PTT switch 215 that is so coupled, the PTT circuit 250 may assign the ability to engage a PTT function of one or more audio devices to one or more possible positions of the PTT switch 215 depending on the quantity and/or type of audio devices coupled to the connectors 220a-b. For example, where only one audio device (e.g., either a single ICS or a single radio) is coupled to one of the connectors 220a or 220b, and nothing is coupled to the other one of those connectors, the PTT circuit 250 may assign the ability to activate the PTT function of that one audio device to more than one of the possible positions to which the PTT switch 215 may be operated. However, once a second audio device is also coupled (e.g., two radios or a radio and an ICS), the PTT circuit 250 will assign the ability to activate the PTT function of one of the two audio devices to one of the possible positions of the PTT switch 215, and will assign the ability to activate the PTT function of the other of the two audio devices to another of the possible positions of the PTT switch 215.

It is envisioned that during normal operation, electric power will be provided by at least the power source 290 (or temporarily through the power source 290 by an ICS via the power2 conductor 229c), if not also one or more audio devices coupled to the connectors 220a-b, and thus, it is envisioned that electric power will be available for normal operation of the control circuit 260 to enable the control circuit 260 to operate the active coupler 245. As those familiar with the various variants of ICS that may be found in some vehicles, including airplanes, some variants of ICS may output audio only on one of the audio1 conductor 222b or the audio2 conductor 223, while other variants output audio on both of these conductors. Either in response to the manual operation of a manually-operable control (not shown) that is coupled to the control circuit 260 or in response to results of tests of these two conductors performed by the control circuit 260 that reveal whether a given ICS is outputting audio on one or both, the control circuit 260 may operate the active coupler 245 to couple together the nodes 225a and 225b to enable audio provide through only one of the audio1 conductor 222b or the audio2 conductor 223 by that given ICS to be provided to both ears of a user.

However, if electric power is unavailable from the power source 290 (e.g., the power source 290 is depleted in embodiments in which the power source 290 is a battery), and is unavailable from any audio device coupled to the connectors 220a-b, the JFET 249 provides an alternative coupler by which the nodes 225a and 225b may be selectively coupled. The gate conductor 224a couples the gate input of the JFET 249 to the ground conductor 221 through the resistor 248, and this coupling of the gate input of the JFET 249 to ground has the effect of causing the JFET 249 to become conductive, thereby serving as a coupler that couples the nodes 225a and 225b, unless the gate conductor 224a is driven to the negative voltage level output by the JFET bias source 294. As will shortly be explained in detail, the gate conductor 224a is selectively coupled to the output of the JFET bias source 294 (i.e., coupled to the gate conductor 224c), depending on what cables are coupled to the connectors 220a and 220b. Thus, the JFET 249 is able to become conductive (and thus, couple the nodes 225a and 225b) either when the gate conductors 224a and 224c are not coupled or when there is no electric power provided to the JFET bias source 294 from which to generate its negative voltage level output. In one possible variation of mixing circuitry of the electrical architecture 2000, the active coupler 245 may be replaced by the control circuit 260 being directly or indirectly coupled to the JFET 249 to allow the control circuit 260 to operate the JFET 249 to selectively couple the nodes 225a and 225b. It may be that the control circuit 260 is coupled to the JFET bias source 294 in a manner that enables the control circuit 260 to in some manner employ the JFET bias source 294 in controlling the JFET 249. In this way, in addition to being an alternate coupler of the nodes 225a and 225b, the JFET 249 may be employed as the active coupler of these two nodes under active control of the control circuit 260.

Figure 3B:
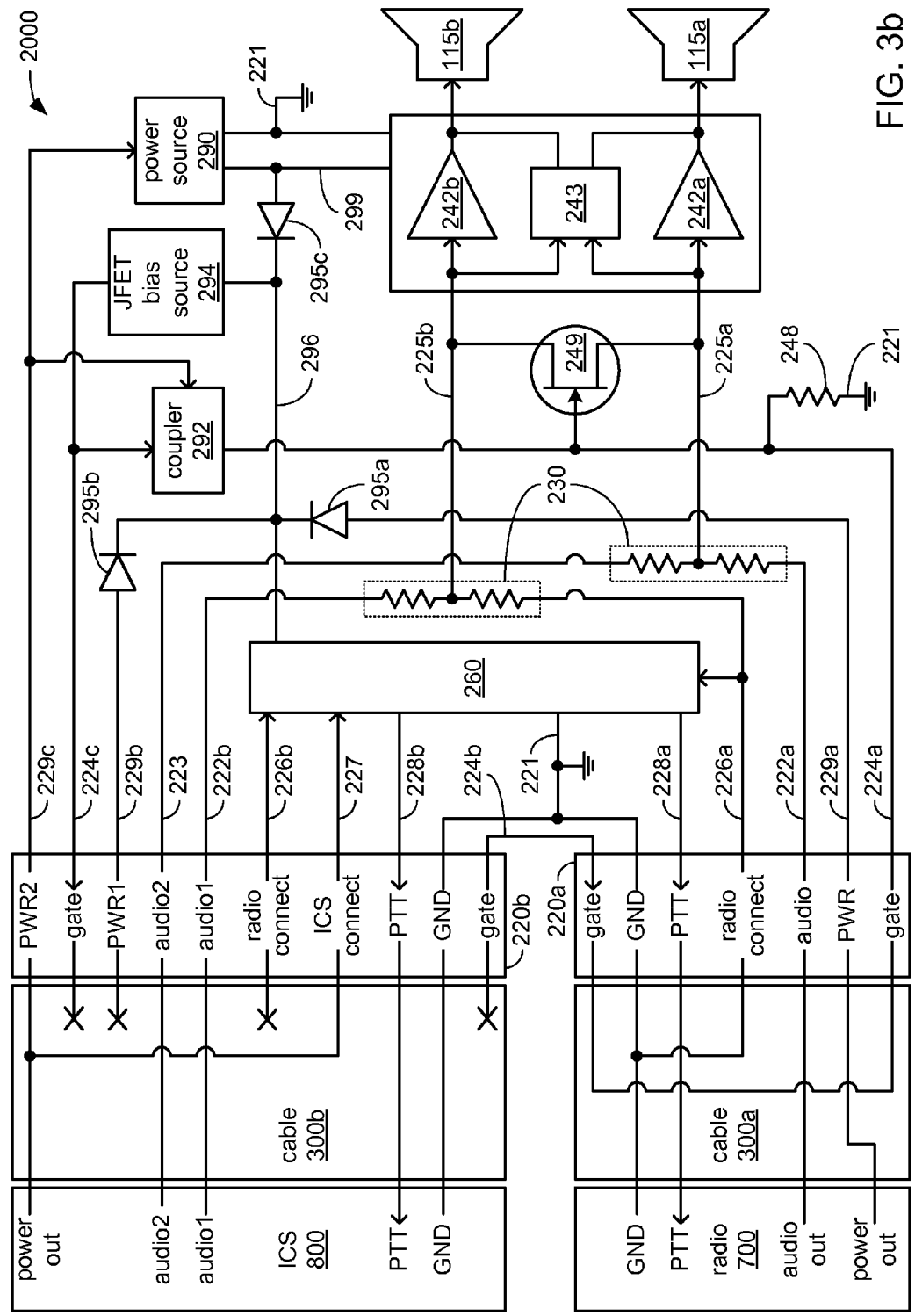

FIGS. 3a and 3b, taken together, depict various possible coupling configurations of an embodiment of the headset 1000 employing the electrical architecture 2000 of FIG. 2 (including mixing circuitry) in which different possible ones or combinations of the cables 300a-c are employed to couple different possible ones or combinations of audio devices to the connectors 220a and/or 220b. It should be noted that what is depicted in each of FIGS. 3a and 3b is a subset of the portion of the electrical architecture 2000 that is depicted in FIG. 2. For the sake of reducing distraction and enhancing ease of understanding, the subset depicted in FIGS. 3a and 3b excludes some components that were depicted in FIG. 2, but which are not as germane to what is presented and is about to be discussed with regard to FIGS. 3a-b. FIGS. 3a-b and the following text that accompanies these figures are centered more on aspects of how audio provided by various audio device to the headset 1000 is mixed for acoustic output to the ears of a user via the acoustic drivers 115a-b under various circumstances, including instances where electric power is unavailable.

FIG. 3a depicts a coupling configuration in which the radio 700 is coupled to the connector 220a via the cable 300a, and in which the radio 900 is coupled to the connector 220b via the cable 300c. With the coupling of the radio 700 to the connector 220a via the cable 300a, the radio 700 is coupled to at least the ground conductor 221, the audio conductor 222a, the PTT conductor 228a and the power conductor 229a through the cable 300a and the connector 220a. With the coupling of the radio 900 to the connector 220b via the cable 300c, the radio 900 is coupled to at least the ground conductor 221, the audio1 conductor 222b, the PTT conductor 228b and the power1 conductor 229b through the cable 300c and the connector 220b. The ICS connect conductor 227 and the power2 conductor 229c of the connector 220b are not coupled.

With the coupling of the cables 300a and 300c to the connectors 220a and 220b, respectively, conductive loops within these cables couple the radio connect conductors 226a and 226b to ground as one possible way in which an indication is provided to the control circuit 260 that two radios are coupled to the headset 1000. However, as previously discussed, other mechanisms may be employed in other embodiments to enable the control circuit 260 to identify the type and quantity of audio devices coupled to the headset 1000. The coupling of the radio connect conductor 226a to ground by the conductive loop within the cable 300a also couples a portion of the mixing circuit 230 that is coupled to the node 225b to ground. Within the cable 300c, another conductive loop couples the audio2 conductor 223 to ground, thereby also coupling a portion of the other mixing circuit 230 that is coupled the node 225a to ground. In this way, both of the mixing circuits 230 are caused to provide a relatively similar degree of attenuation on whatever audio signal is conveyed to the nodes 225a and 225b.

With all of these couplings made, the radio 700 is able to output an audio signal to the audio conductor 222a and the radio 900 is able to output an audio signal to the audio1 conductor 222b. As long as the nodes 225a and 225b are not coupled through either the active coupler 245 (refer to FIG. 3) or the JFET 249, each ear of a user of the headset 1000 is provided with audio from a different one of the radios 700 and 900. Again, this has been found to be advantageous in enabling a user to quickly determine which radio that user is hearing someone through so as to more easily maintain a clear mental picture of the locations of different individuals who may be talking to the user at the same time.

With the coupling of the cables 300a and 300c to the connectors 220a and 220b, respectively, other conductive loops within these cables couple the gate conductor 224a to the gate conductor 224b and further couple the gate conductor 224b to the gate conductor 224c. In this way, the output of the JFET bias source 294 is coupled through these conductors and conductive loops to the gate of the JFET 249. With the JFET bias source 294 and the JFET 249 so coupled, the grounding of the gate input of the JFET 249 through the resistor 248 can be overcome by the direct provision of the negative voltage level output of the JFET bias source 294, thereby preventing the JFET 249 from becoming conductive, and thereby preventing the nodes 225a and 225b from being coupled through the JFET 249 such that the audio of these two nodes would be mixed. However, this presumes that the cables 300a and 300c remain coupled to the connectors 220a and 220b, respectively, and this presumes that the JFET bias source 294 is provided with electric power from at least one of the radio 700 through the power conductor 229a and the diode 295a, the radio 900 through the power1 conductor 229b and the diode 295b, and/or the power source 290 through the power conductor 299 and the diode 295c. If either of the cables 300a or 300c is uncoupled, or if the electric power required for the JFET bias source 294 to generate its negative voltage level output is not provided by any of these three power sources, then the gate input of the JFET 249 becomes grounded through the resistor 248, and the JFET 249 becomes conductive such that it couples the nodes 225a and 225b.

The reliance on both of the cables 300a and 300c remaining coupled to the connectors 220a and 220b respectively for the output of the JFET bias source 294 to be coupled to the gate input of the JFET 249 provides a mechanism for causing the nodes 225a and 225b to be coupled when one of the radios 700 or 900 is not coupled by its associated one of the cables 300a or 300c to the headset 1000. With both radios 700 and 900 being coupled to the headset 1000 by these cables, the separate presentation of audio from each of these radios to a different ear is not changed by operation of the JFET 249. However, with only one of these radios connected, audio from the remaining one of these radios that would be presented to only one of a user's ears is caused to be presented to both of the user's ears through the coupling of the nodes 225a and 225b through the JFET 249, thereby allowing the user to employ both ears to better listen to the one radio that is still coupled to the headset 1000.

The ability to rely on electric power provided by either of the radios 700 or 900, or from the power source 290 to supply the JFET bias source 294 with the electric power needed to cause the JFET 249 to not become conductive provides a mechanism for causing the nodes 225a and 225b to be coupled when no electric power is available from any of these three sources. A presumption is made that such an absence of electric power from all three of these sources is an abnormal circumstance. It is relatively common for radios to provide some form of electric power for use by various accessories that may be coupled to them; and unless the power source 290 is fully depleted, it should be able to provide the relatively small amount of electric power needed by the JFET bias source 294 (which as previously discussed, is far less electric power than is needed by the audio amplifiers 242a-b). Thus, if there is no electric power available to the JFET bias source 294 from any of these three sources, then it is presumed that there is no electric power being provided to the audio amplifiers 242a-b and to the control circuit 260. Under such circumstances, the bypass circuit 243 would respond by directly coupling the nodes 225a and 225b to the acoustic drivers 115a and 115b, respectively, to allow the radios 700 and/or 900 to drive them more directly. It is presumed, that as a result of this loss of amplification by the audio amplifiers 242a-b, the audio provided to the ears of a user of the headset 1000 will have a lower volume, and thereby be more difficult for the user to hear. With the JFET 249 being caused by this lack of electric power to couple the nodes 225a and 225b, a user of the headset 1000 is able to use both ears to hear the audio provided by either of the radios 700 and 900, which may prove desirable to allow the user to more easily hear the audio of each of these radios under circumstances in which such audio amplification has been lost.

In one possible variation of what is depicted in FIG. 3a, the cable 300c may provide the ability to couple a third audio device to the headset 1000, that third audio device being capable only of outputting audio to the headset 1000, and not capable of two-way communications. More specifically, the cable 300c may, instead of coupling the audio2 conductor 223 to ground as shown, enable the coupling of the audio source 950 to the headset 1000 such that the audio source 950 would provide audio to the headset 1000 through the audio2 conductor 223. With the use of such a variation of the cable 300c, the mixing circuit 230 that is coupled to the node 225a would mix the audio provided by the radio 700 via the audio conductor 222a with the audio provided by the audio source 950 via the audio2 conductor 223. As previously discussed, the audio source 950 may any of a variety of audio devices, i.e., devices providing an audio output, including and not limited to, a talking GPS device, a talking environmental sensing device (e.g., a talking chemical, biological or radiological hazard sensing device), etc.

FIG. 3b depicts a coupling configuration in which the radio 700 is coupled to the connector 220a via the cable 300a, and in which the ICS 800 is coupled to the connector 220b via the cable 300b. As in the coupling configuration depicted in FIG. 3a, with the coupling of the radio 700 to the connector 220a via the cable 300a, the radio 700 is coupled to the ground conductor 221, the audio conductor 222a, the PTT conductor 228a and the power conductor 229a through the cable 300a and the connector 220a. With the coupling of the ICS 800 to the connector 220b via the cable 300b, the ICS 800 is coupled to the ground conductor 221, the audio1 conductor 222b, the audio2 conductor 223, the ICS connect conductor 227, the PTT conductor 228b and the power2 conductor 229c through the cable 300b and the connector 220b. The gate conductors 224b-c, the radio connect conductor 226b, and the power1 conductor 229b of the connector 220b are not coupled.

With the coupling of the cables 300a and 300b to the connectors 220a and 220b, respectively, conductive loops within these cables couple the radio connect conductor 226a to ground and couple the ICS connect conductor 227 to the power output by the ICS 800 on the power conductor 229c as one possible way in which an indication is provided to the control circuit 260 that an ICS and a radio are coupled to the headset 1000. Again, the coupling of the radio connect conductor 226a to ground by the conductive loop within the cable 300a also couples a portion of the mixing circuit 230 that is coupled to the node 225b to ground. Unlike within the variant of the cable 300c depicted in FIG. 3a, both the audio1 conductor 222b and the audio2 conductor 223 are coupled to the ICS 800, and neither is coupled by a conductive loop to ground in the cable 300b. In this way, the mixing circuit 230 that is coupled to the node 225a is caused to mix the audio provided by the radio 700 via the audio conductor 222a with the audio provided by the ICS 800 via the audio2 conductor 223, and the mixing circuit 230 that is coupled to the node 225b is caused to attenuate the audio provided by the ICS 800 via the audio1 conductor 222b to a degree similar to what the audio provided via the audio2 conductor 223 is subjected to.

With all of these couplings made, the radio 700 is able to output an audio signal to the audio conductor 222a and the ICS 800 is able to output audio signals to both of the audio1 conductor 222b and the audio2 conductor 223. As long as the nodes 225a and 225b are not coupled through either the active coupler 245 (refer to FIG. 3) or the JFET 249, audio from the ICS 800 is provided to both ears of a user of the headset 1000, while audio from the radio 700 is provided to only one ear. Similar to the provision of monaural audio from two radios separately to each ear, the provision of the binaural audio of the ICS 800 to both ears accompanied by the provision of the monaural audio of the radio 700 to only one ear has been found to be advantageous in enabling a user to quickly determine whether they are hearing someone through a radio or through an ICS so as to more easily maintain a clear mental picture of the locations of different individuals who may be talking to the user.

In a manner somewhat similar to what was depicted in FIG. 3a with the coupling of the cable 300a to the connector 220a, respectively, with the coupling of the cable 300a to the connector 220a in FIG. 3b, a conductive loop within the cable 300a couples the gate conductor 224a to the gate conductor 224b. However, unlike what was depicted in FIG. 3a, the cable 300b does not incorporate a conductive loop to couple the gate conductor 224b to the gate conductor 224c. Instead of a reliance on conductive loops within cables to couple the output of the JFET bias source 294 to the gate of the JFET 249, the receipt of electric power from the ICS 800 via the power2 conductor 229c is employed as a signal to the coupler 292 to directly couple the gate conductor 224a to the gate conductor 224c. Again, this allows the grounding of the gate input of the JFET 249 through the resistor 248 to be overcome by the direct provision of the negative voltage level output of the JFET bias source 294, thereby preventing the JFET 249 from becoming conductive, and thereby preventing the nodes 225a and 225b from being coupled through the JFET 249 such that the audio of these two nodes would be mixed. By effecting the coupling of the gate conductors 224a and 224c in this manner (rather than via successive conductive loops built into cables as was depicted in FIG. 3a), only the cable 300b (and with it, the ICS 800) need be coupled to the connector 220b to cause these two gate conductors to be coupled. This is in recognition of the fact that the ICS 800 is capable, all by itself, of providing audio to both of the nodes 225a and 225b, such that the radio 700 need not be coupled to the connector 220a and the nodes 225a and 225b need not be coupled to each other to ensure the provision of audio to both ears. However, this still presumes that the JFET bias source 294 is provided with electric power from at least one of the radio 700 through the power conductor 229a and the diode 295a, the radio 900 through the power conductor 229b and the diode 295b, and/or the power source 290 through the power conductor 299 and the diode 295c.

In a manner very similar to what was discussed regarding the provision of electric power in FIG. 3a, the ability to rely on electric power provided by either the radio 700 or the ICS 800, or from the power source 290 to supply the JFET bias source 294 with the electric power needed to cause the JFET 249 to not become conductive provides a mechanism for causing the nodes 225a and 225b to be coupled when no electric power is available from any of these three sources. Thus, if there is no electric power available to the JFET bias source 294 from any of these three sources, then it is presumed that there is no electric power being provided to audio amplifiers 242a-b and to the control circuit 260. Under such circumstances, the bypass circuit 243 would respond by directly coupling the nodes 225a and 225b to the acoustic drivers 115a and 115b, respectively, to allow the radio 700 and/or the ICS 800 to drive them more directly. With the JFET 249 being caused by this lack of electric power to couple the nodes 225a and 225b, a user of the headset 1000 is able to use both ears to hear the audio provided by the radio 700 (if coupled to the connector 220a), which may prove desirable to allow the user to more easily hear its audio while under circumstances in which such audio amplification has been lost.

In one possible variation of what is depicted in FIG. 3b, instead of the electrical architecture 2000 incorporating the coupler 292 to employ power received from the ICS 800 to prevent coupling of the nodes 225a and 225b, the connector 220b may alternatively incorporate an additional contact that is coupled to the gate conductor 224a such that the gate conductor 224a is coupled to a contact in each of the connectors 220a and 220b. This may enable a variant of the cable 300b to employ a conductive loop to couple the gate conductor 224c directly to the gate conductor 224a to ensure that the output of the JFET bias source 294 is coupled to the gate input of the JFET 249 as long as this variant of the cable 300b is coupled to the connector 220b, and regardless of whether anything is coupled to the connector 220a, or not.

Other embodiments and implementations are within the scope of the following claims and other claims to which the applicant may be entitled.

The invention claimed is:

1. An apparatus comprising:
a first earpiece into which a first acoustic driver is disposed to acoustically output a first audio channel;
a second earpiece into which a second acoustic driver is disposed to acoustically output a second audio channel;
a first connector to enable coupling of a first audio device to the apparatus;
a second connector to enable coupling of a second audio device to the apparatus;
powered electronic circuitry; and
a coupler coupling the first and second audio channels such that the same audio is acoustically output by both the first and second acoustic drivers in response to either one of:
  a lack of electric power provided to the powered electronic circuitry through the first connector, through the second connector and from a power source of the apparatus; and
  only the first or second audio device being coupled to the corresponding one of the first and second connectors, wherein the audio device provides the apparatus with only one audio channel.

2. The apparatus of claim 1, the coupler refrains from coupling the first and second audio channels in response to an audio device providing the apparatus with more than one audio channel being coupled to the first connector.

3. The apparatus of claim 2, wherein the audio device providing the apparatus with more than one audio channel is an ICS.

4. The apparatus of claim 1, further comprising a JFET bias source structured to be provided with electric power from any of the first connector, the second connector and the power source of the apparatus; and wherein the coupler is a JFET that becomes non-conductive such that the first and second audio channels are not coupled in response to a gate of the JFET being coupled to the JFET bias source.

5. The apparatus of claim 4, wherein:
the first connector comprises a first contact coupled to the JFET bias source, and a second contact;
the second connector comprises a third contact coupled to the second contact, and a fourth contact coupled to the gate of the JFET;
the first and second contacts are coupled when the first audio device providing only the first audio channel is coupled to the first connector; and
the third and fourth contacts are coupled when the second audio device providing only the second audio channel is coupled to the second connector.

6. The apparatus of claim 5, wherein:
the first connector comprises a fifth contact by which a third audio device providing both the first and second audio channels is able to provide electric power to the apparatus while coupled to the first connector; and
the apparatus further comprises another coupler coupled to the fifth contact to couple the JFET bias source to the gate of the JFET in a manner that bypasses the first, second, third and fourth contacts in response to receiving electric power from the fifth contact.

7. The apparatus of claim 5, wherein:
the first connector comprises a fifth contact coupled to the gate of the JFET; and
the first and fifth contacts are coupled when a third audio device providing both the first and second audio channels is coupled to the first connector.

8. The apparatus of claim 4, wherein:
the first connector comprises a first contact coupled to a first audio conductor of the apparatus through which the first audio channel may be received, and a second contact coupled to a second audio conductor of the apparatus through which the second audio channel may be received; and
the apparatus further comprises a control circuit structured to perform tests on the first and second conductors to determine whether an audio device is coupled to the first and second conductors, and to operate the coupler to couple the first and second audio channels in response to results of the tests.

9. A method comprising:
monitoring a first connector of an apparatus;
monitoring a second connector of an apparatus;
operating a coupler to couple a first audio channel to be acoustically output by a first acoustic driver of the apparatus to a second audio channel to be acoustically output by a second acoustic driver of the apparatus such that the same audio is acoustically output by both the first and second acoustic drivers in response to either of:
- a lack of electric power provided to powered electronic circuitry in the apparatus through the first connector, through the second connector and from a power source of the apparatus; and
- an audio device being coupled to only one of the first and second connectors, wherein the audio device provides the apparatus with only one audio channel.

10. The method of claim 9, further comprising refraining from coupling the first and second audio channels in response to an audio device providing the apparatus with more than one audio channel being coupled to the first connector.

11. The method of claim 10, wherein the audio device providing the apparatus with more than one audio channel is an ICS.

12. An apparatus comprising:
a first earpiece into which a first acoustic driver is disposed to acoustically output a first audio channel;
a second earpiece into which a second acoustic driver is disposed to acoustically output a second audio channel;
a first connector to enable coupling of a first audio device to the apparatus;
a second connector to enable coupling of a second audio device to the apparatus;
powered electronic circuitry comprising a JFET bias source structured to be provided with electric power from any of the first connector, the second connector and the power source of the apparatus; and
a coupler coupling the first and second audio channels such that the same audio is acoustically output by both the first and second acoustic drivers in response to either one of:
  a lack of electric power provided to the powered electronic circuitry through the first connector, through the second connector and from a power source of the apparatus; and
  only the first or second audio device being coupled to the corresponding one of the first and second connectors, wherein the audio device provides the apparatus with only one audio channel;
wherein
the coupler comprises a JFET that becomes non-conductive such that the first and second audio channels are not coupled in response to a gate of the coupler JFET being coupled to the JFET bias source;
the first connector comprises a first contact coupled to the JFET bias source, and a second contact;
the second connector comprises a third contact coupled to the second contact, and a fourth contact coupled to the gate of the JFET;
the first and second contacts are coupled when the first audio device providing only the first audio channel is coupled to the first connector; and
the third and fourth contacts are coupled when the second audio device providing only the second audio channel is coupled to the second connector.

13. The apparatus of claim 12, wherein:
the first connector comprises a fifth contact by which a third audio device providing both the first and second audio channels is able to provide electric power to the apparatus while coupled to the first connector; and
the apparatus further comprises another coupler coupled to the fifth contact to couple the JFET bias source to the gate of the JFET in a manner that bypasses the first, second, third and fourth contacts in response to receiving electric power from the fifth contact.

14. The apparatus of claim 12, wherein:
the first connector comprises a fifth contact coupled to the gate of the JFET; and
the first and fifth contacts are coupled when a third audio device providing both the first and second audio channels is coupled to the first connector.

15. An apparatus comprising:
a first earpiece into which a first acoustic driver is disposed to acoustically output a first audio channel;
a second earpiece into which a second acoustic driver is disposed to acoustically output a second audio channel;
a first connector to enable coupling of a first audio device to the apparatus;
a second connector to enable coupling of a second audio device to the apparatus;
powered electronic circuitry comprising a JFET bias source structured to be provided with electric power from any of the first connector, the second connector and the power source of the apparatus; and
a coupler coupling the first and second audio channels such that the same audio is acoustically output by both the first and second acoustic drivers in response to either one of:
  a lack of electric power provided to the powered electronic circuitry through the first connector, through the second connector and from a power source of the apparatus; and
  only the first or second audio device being coupled to the corresponding one of the first and second connectors, wherein the audio device provides the apparatus with only one audio channel;
wherein
the coupler comprises a JFET that becomes non-conductive such that the first and second audio channels are not coupled in response to a gate of the coupler JFET being coupled to the JFET bias source;
the first connector comprises a first contact coupled to a first audio conductor of the apparatus through which the first audio channel may be received, and a second contact coupled to a second audio conductor of the apparatus through which the second audio channel may be received; and
the apparatus further comprises a control circuit structured to perform tests on the first and second conductors to determine whether an audio device is coupled to the first and second conductors, and to operate the coupler to couple the first and second audio channels in response to results of the tests.

* * * * *